No. 641,476. Patented Jan. 16, 1900.
E. TORRES.
REPEATING STRIKING MECHANISM FOR CLOCKS.
(Application filed July 29, 1899.)
(No Model.) 3 Sheets—Sheet 1.
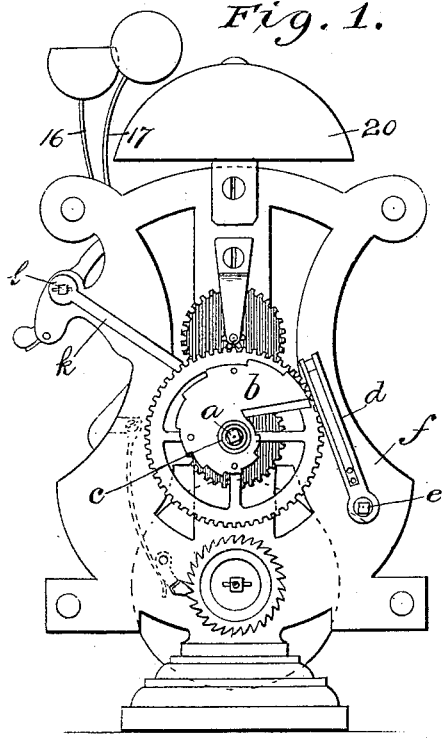
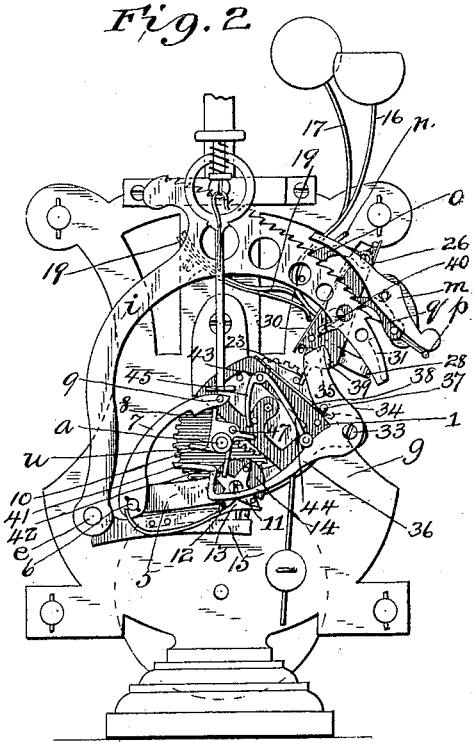
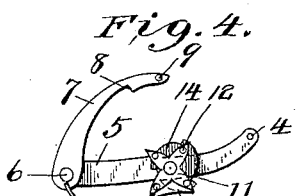
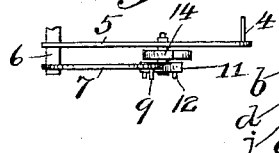
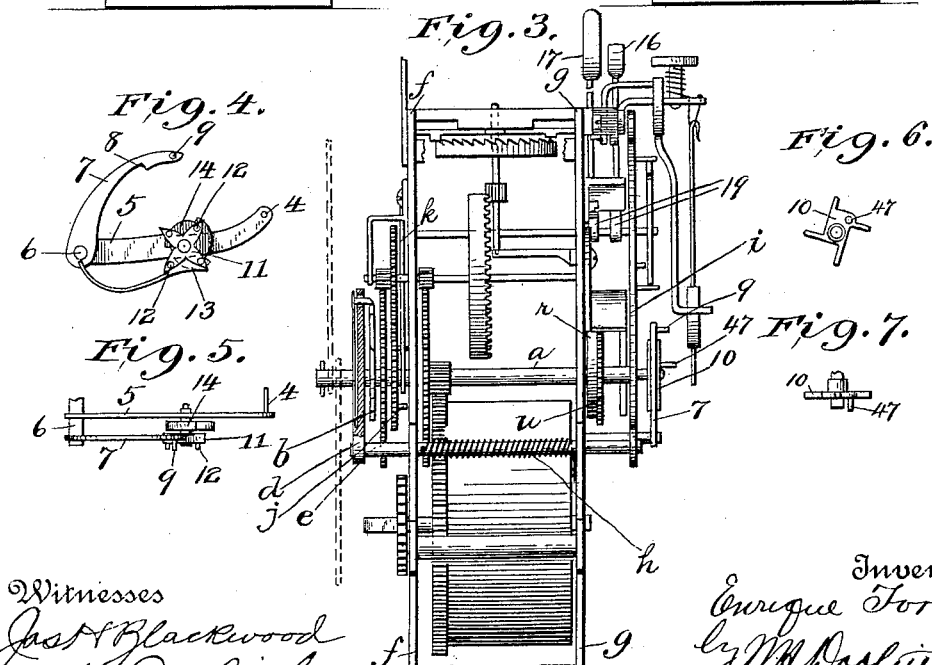
Witnesses
Jas. F. Blackwood
H. P. Doolittle
Inventor
Enrique Torres
by M. H. Doolittle & Son
Attorneys
THE NORRIS PETERS CO., PHOTO-LITHO., WASHINGTON, D. C.

No. 641,476. Patented Jan. 16, 1900.
E. TORRES.
REPEATING STRIKING MECHANISM FOR CLOCKS.
(Application filed July 29, 1899.)
(No Model.) 3 Sheets—Sheet 2.
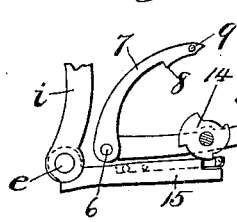
Fig. 8.
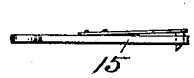
Fig. 9.
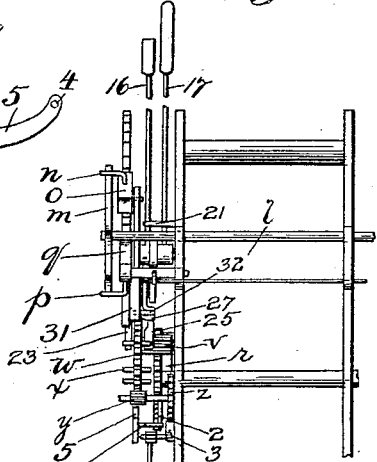
Fig. 10.
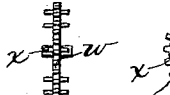
Fig. 11. Fig. 12.
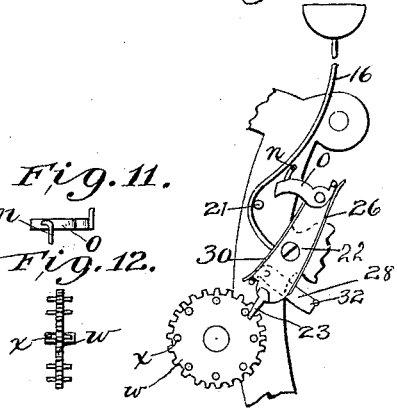
Fig. 13.
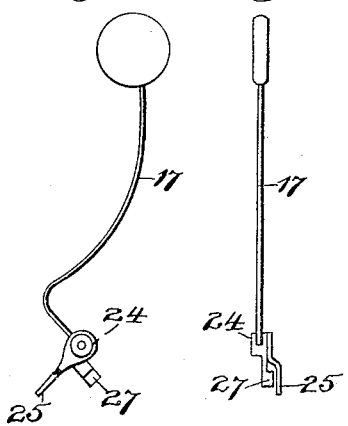
Fig. 15. Fig. 16.
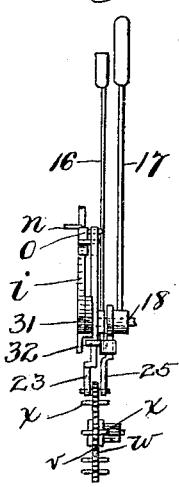
Fig. 17.
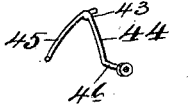
Fig. 22.
Fig. 14.
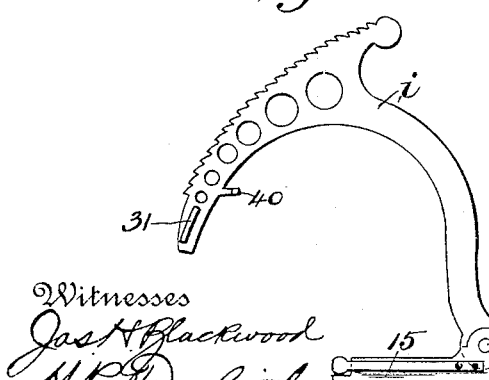
Fig. 18.
Fig. 20.
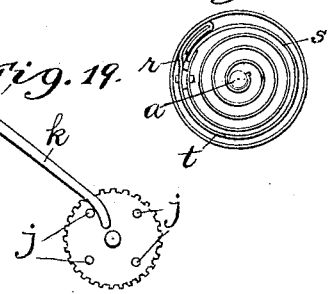
Fig. 19. Fig. 21.
Witnesses
Jas H Blackwood
H P Doolittle
Inventor
Enrique Torres
by M Doolittle & Son
Attorneys No. 641,476. Patented Jan. 16, 1900.
E. TORRES.
REPEATING STRIKING MECHANISM FOR CLOCKS.
(Application filed July 29, 1899.)
(No Model.) 3 Sheets—Sheet 3.
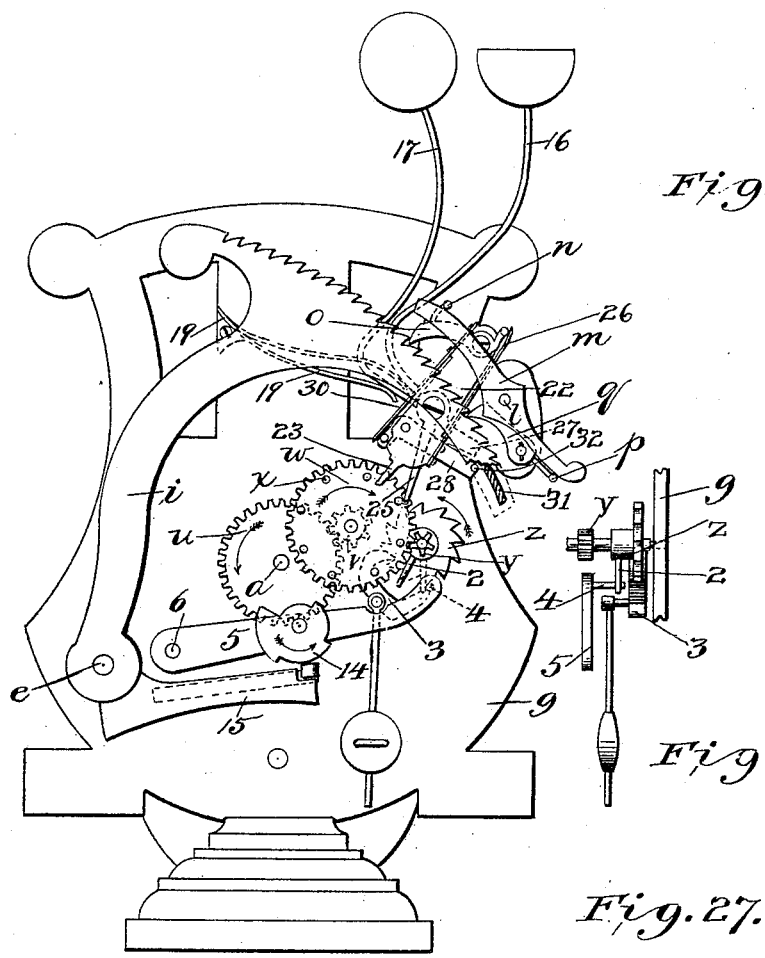
Fig. 23.
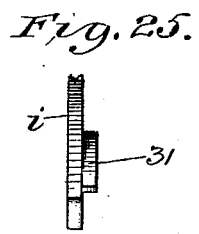
Fig. 25.
Fig. 24.
Fig. 27.
Fig. 26.
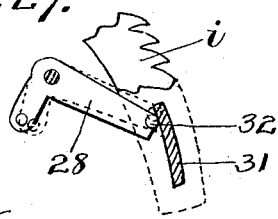
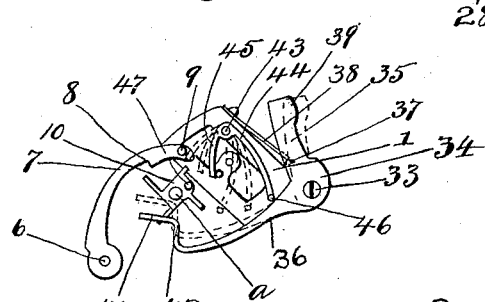
Witnesses
Jos. H. Blackwood
Marcus C. Hopkins
Inventor
Enrique Torres
by W. H. Doolittle & Son
Attorneys
THE NORRIS PETERS CO., PHOTO-LITHO., WASHINGTON, D. C.

UNITED STATES PATENT OFFICE.

ENRIQUE TORRES, OF GUADALAJARA, MEXICO.

REPEATING STRIKING MECHANISM FOR CLOCKS.

SPECIFICATION forming part of Letters Patent No. 641,476, dated January 16, 1900.

Application filed July 29, 1899. Serial No. 725,498. (No model.)

*To all whom it may concern:*

Be it known that I, ENRIQUE TORRES, a citizen of the Republic of Mexico, residing at Guadalajara, State of Jalisco, Mexico, have invented a new and useful Clock, (Case B,) of which the following is a full, clear, and exact specification, such as will enable others skilled in the art to which it appertains to make and use the same.

My invention relates to repeating clocks, and has for its objects to provide means whereby the clock may be set to strike the sounds indicating the hour last struck and also the quarter-hours at each quarter or to strike merely the hours and sounds indicating the quarters without repetition of the hours at the quarters or not to strike at all, to provide means for giving different sounds to the indications of the quarter-hours and hours, to provide a spring-actuated mechanism for operating the striking mechanism independent in operation of the time-train, but having its power stored up by the movement of said time-train, and to generally improve and simplify the construction of clocks of this character.

My invention is illustrated in the accompanying drawings, in which like letters and figures of reference denote the same parts, and in which—

Figure 1 is a front view elevation of the clock with face removed; Fig. 2, a rear view in elevation; Fig. 3, a side view in elevation; Fig. 4, a detail elevation view of rocking trip-arm; Fig. 5, a top plan of parts shown in Fig. 4; Fig. 6, a detail elevation of main-arbor star-wheel; Fig. 7, a top plan projection of same; Fig. 8, a detail elevation of rocking trip-arm and rocking rack-arm; Fig. 9, a top plan of latter arm; Fig. 10, a side view in elevation from side opposite Fig. 3; Fig. 11, a detail of rack-plate impulse-pawl; Fig. 12, a detail of revolving pin-wheel for vibrating the hammers; Fig. 13, a detail side view of said wheel and hammers; Fig. 14, a side detail of one hammer; Figs. 15 and 16, details of the other hammer; Fig. 17, a detail edge view of both hammers; Fig. 18, a detail side view of swinging rack and its trip-actuating rocking arm; Fig. 19, front elevation detail of quarters-pin gear-wheel and rocking releasing-arm of rack; Fig. 20, a top detail plan of form of snail-controlling lever and spring-tooth; Fig. 21, a detail of spring in drum of striking mechanism; Fig. 22, a detail of the setting-lever; Fig. 23, a front elevation of the clock with some of the parts taken away; Fig. 24, a side detail view of escapement and means controlling the same; Fig. 25, a detail of drum that drives the striking mechanism; Fig. 26, a detail front view of setting-lever and parts controlled thereby, and Fig. 27 a detail front view of one of the hammers and pin thereon and ledge on the rack to contact with the pin to push the hammer out of parallel position to the other hammer.

Referring to the drawings, $a$ is the main arbor of the clock, to which is secured the minute-hand. A snail $b$ is secured to a sleeve $c$, which is mounted rotatably on the arbor and is driven by an ordinary train of gearing. The snail is given a complete revolution once in twelve hours. A lever $d$, having a tooth at its free end for engaging the snail, is mounted on a rocking shaft $e$, journaled in the front and rear plates $f\ g$, respectively, of the frame. A spring $h$ surrounds said shaft and is attached thereto and to the frame and tends to normally force the lever $d$ away from engagement with the steps of the snail. On the rear end of rocking shaft $e$ is fixed the lower end of the upwardly-extending arm of a segmental rack $i$, (shown in Fig. 18,) which is provided on its upper edge with twelve or more teeth.

Mounted on the inner face of one of the front gear-wheels are four pins $j$, corresponding to the four quarters of the hour. A lever $k$ has its free end in contact with these pins and its other end fixed to a rocking shaft $l$, journaled in the two plates $f\ g$ of the frame and having its rear end extending some distance beyond the plate $g$. To this rear end of the rocking shaft is secured a release-lever $m$, having the end of one arm adapted to contact with a pin $n$ of a spring-controlled pivoted impulse-pawl $o$ and the other end adapted to contact with the pin $p$ of a detent-pawl $q$, pivoted to the frame of the clock. The release-lever $m$ bears on the under side of the pin of pawl $o$ and on the upper side of the pin of pawl $q$, so that the rocking of the lever will simultaneously release the pawls from engagement with the segmental rack.

Mounted loosely on main arbor $a$, at the rear end thereof just back of plate $g$, is a drum $r$, carrying within it a coiled spring $s$, one end of which is attached to the main arbor $a$ and is wound up thereby and the other end of which is secured to a band $t$, loosely placed within the drum and adapted to turn therein under extreme tension exerted thereon by the winding of the spring and to thereby prevent the spring being broken by excessive winding. The drum carries a toothed wheel $u$ on its edge and by this wheel is connected to the striking mechanism, so that the spring of the drum when released will actuate said striking mechanism in the manner hereinafter described. The wheel $u$ meshes with a pinion $v$, fixed to the shaft of a toothed wheel $w$, which carries eight axially-extending pins $x$, arranged at equal intervals around the wheel, near the perimeter thereof, and extending on each side of the wheel.

Meshing with the wheel $w$ is a pinion $y$, mounted on a shaft which also carries a spur escapement-wheel $z$. The shafts of pinions $y$ and $v$ are journaled at one end in the plate $g$ and in the other end in bridge $i'$, secured to and projecting from the plate. The escapement-wheel $z$ is provided on its inner surface with a radial detent-pin 2. An anchor 3 is hung below said escapement-wheel and is provided with pallets to engage the wheel and with a governing-weight. A latch-pin 4 is adapted to contact with and move away from the radial detent-pin of the escapement-wheel, so as to alternately hold and release said wheel. The latch-pin 4 is mounted upon the end of a rocking arm 5, which has its other end fixed to rocking shaft 6, on which shaft is also carried the upwardly-curving trip-arm 7, provided with notch 8 and laterally-extending pin 9. Fixed on the end of arbor $a$ is a star-wheel 10 of four points, which correspond to the quarters of an hour and are adapted to contact with and trip the rocking trip-arm 7 by raising the same and then releasing it by the fall of one of the points into the notch 8.

On rocking arm 5 is rotatably carried a star-wheel 11, having four points and laterally-extending pins 12 in each point. These pins project into the path of the arms of star-wheel 10, as shown in Fig. 2, and by means of their engagement the star-wheel 11 is turned a fourth of a revolution at each quarter of an hour.

A spring-pressed beveled pawl 13 is secured to arm 7 and engages the pins of star-wheel 11, so as to hold the same in position except when turned by star-wheel 10. Secured to star-wheel 11 is a snail 14, having four steps of different heights, and against this snail is adapted to bear the tooth of a vertically-rocking arm 15, fixed to and moving with the segmental rack $i$ and shaft $e$. The arm 15 is moved up by the rack and is limited in its movement by the steps on the snail and to an extent corresponding to the depth of the particular step engaged. This construction is for the purpose of regulating the striking of the quarters after the repetition of the hours, as hereinafter more fully explained.

The construction of the bell-hammers and their connections with the actuating mechanism is as follows: 16 is the rear bell-hammer next to the rack, and 17 is the other bell-hammer. Both are mounted by sleeved bearings loosely on a rod 18, projecting from the frame. Springs 19 tend to press forward the hammers 16 and 17 toward the bell 20, while a pin 21, projecting from the frame, limits their forward movement. The lower end of hammer 16 is provided with a fan-like extension 22, to which is secured a lug 23. A similar extension 24 on the other hammer carries a lug 25, similar to and parallel to the lug 23. These lugs are in the path of the pins $x$ on the wheel $w$ and are adapted to be struck by said pins, so as to move in the revolution of the wheel and to cause the hammers to be vibrated. Pivoted to the upper end of extension 22 is the impulse-pawl $o$, heretofore described, which is normally pressed into engagement with the teeth of the rack by a flat spring 26 and is adapted to impart a step-by-step movement to the rack by the vibration of the hammer to which it is pivoted.

Integral with extension 24 of hammer 17 and projecting therefrom at right angles is an arm 27. Pivoted to extension 22 of hammer 16 is an arm 28, carrying at its outer end a lug 29, the inner face of which is kept normally in contact with the flattened end of the arm 27 of the other hammer by means of a flat spring 30 bearing against the inner end of the said pivoted arm 28. The contact-lugs of the hammers are normally parallel and are both struck by the same pin on the revolving pin-wheel at the same time when the hours are being struck, thus sounding the hours by both hammers simultaneously, and thereby producing a stronger and more harmonious sound than if only one hammer were used.

For the quarters double half-notes are sounded, which are produced by causing the hammers to strike one after the other in the same time that one sound is made to indicate one of the hours. A distinctive sound is thus given to the quarterly strikings. The mechanism for effecting this result consists of the fixed and pivoted arms attached to their respective hammers, as aforesaid, and a ledge 31 on the inner side of the rack and on the end thereof beyond the line of teeth and projecting toward the front of the clock. The inner side of this ledge is adapted to contact with a pin 32 on the forward end of the pivoted arm 28 of hammer 16 in the upward travel of the rack.

The means for setting the striking mechanism in the different positions for striking the hours and the quarters alone, for repeating the hour at each quarter and at the same time striking the quarters, and for rendering the striking mechanism silent are as follows: Pivoted on a screw 33 on the bridge $i'$ is a check-lever 34, having an upwardly-extending arm 35 and a horizontally-extending arm 36. A pin 37 is secured on the inner side of arm 35 and is pressed against by a spring 38, which thus tends to normally hold lever 34 upward. A lateral projection 39 is formed on the upper end of arm 35 and is adapted to engage with a pin 40, projecting from the rear side of the segmental rack. The arm 36 is curved and at its free end is provided with a hook 41, forming an inclined plane and having a shoulder 42. To the bridge $i'$ is pivoted a setting-lever 43, having arms 44 and 45. At the lower end of arm 44 is formed a shoulder 46, adapted to contact with arm 36 of the check-lever. A suitable handle may extend from this shoulder by which the setting-lever can be adjusted. The setting-lever can be set to the three positions necessary to produce the striking of the quarters alone, repeating of the hours, or silence.

On the star-wheel 10 is a pin 47, adapted to contact with hook 41 and fall down shoulder 42 for the purpose hereinafter described.

The operation of the clock is as follows: If it is desired that the clock should repeat the hours when striking, the setting-lever is moved to the extreme right, as shown in Fig. 2 of the drawings, whereby the shoulder 46 (shown in Fig. 22) will depress the check-lever so as to carry the projection 39 out of the path of pin 40 on the rack. Four or five minutes before the hand reaches each of the quarters one of the pins $j$ on the front gear-wheel strikes and raises the end of the bar $k$, rocking shaft $l$ and lever $m$, which thereupon disengage simultaneously pawls $o$ and $q$ from the rack and permit the same to fall to an extent limited by engagement of lever $d$ with the snail. Suppose an hour only is to be struck. Then the lever will fall upon the step succeeding the one on which it has just been pressing. The star-wheel 10, being carried around by the main arbor, will press up by one of its points the arm 7, as shown in Fig. 2, thereby raising arm 5 and holding its pin against the radial pin of the escapement-wheel of the striking-train, so as to prevent the revolution of the latter. When, however, one of the quarters is reached, a star-point will enter notch 8 and arm 7 will fall down and separate pins 4 and 2 and permit the release of the escapement and allow the striking mechanism to be driven by the spring $s$. This spring has been and continues to be wound up by the main arbor, and when the controlling-escapement is released the tension of the spring turns drum $r$ and wheel $u$, and the latter wheel through connecting-pinion $v$ rotates pin-wheel $w$. The pins of the last-named wheel trip and rock the hammers 16 and 17. The wheels have the proper relative number of teeth to give the necessary number of strokes to the bell-hammers for the hours and quarter-hours, and the number of teeth of each part need not be here set forth. The rapidity of rotation of the pin-wheel is controlled by the weighted governor of the escapement. When the lugs of the bell-hammers are struck by a pin, the hammers are carried backward until released by the pin, when they are thrown forward against the bell by the force of their springs. The vibrating hammer 16 carries back and forth the impulse-pawl $o$, Fig. 13, and the rack, which has fallen down a number of teeth corresponding to the number of the hour to be struck, as determined by the hour-snail and lever $d$, is carried back one step at each vibration of the hammer and detent-pawl $q$ checks the rack from backward movement. In its upward movement the rack carries upwardly arm 15 toward its normal position of contact with snail 13 of arm 5. If merely the hour, as two, three, or four o'clock, is to be struck, the highest step of the snail 13 will be at the bottom and the tooth of arm 16 will strike against this step and raise the arm 5, the pin 4 of which will contact with the pin of the escapement-wheel 2 and stop the striking. In striking the hours the rack is always, of course, moved up to the same tooth—that is, until the detent-pawl engages the fourth tooth from the lower end, the remaining three teeth corresponding to the three quarters, and one, two, or three of said teeth being engaged by the impulse-pawl, according to the quarter that is being struck, as hereinafter described. Now when the first quarter is reached the rack will fall the same number of teeth as before and will repeat the hour previously struck; but the arm 15 of the rack will strike against the next lower step of the snail 14 and the rack will consequently be allowed to move up one tooth farther. At the same time the rack moves to this additional tooth the ledge 31 will strike the pin 32 and depress arm 28, so that the lug 23 of hammer 16 will be thrown back out of line with lug of hammer 17, as shown in Fig. 14, whereby each pin of the pin-wheel will strike hammer 16 first and then hammer 17, vibrating them alternately, so as to give a double sound to the striking, that indicates the quarter. At the half-hour the hour will be again repeated and arm 15 will rise into a lower step of the snail 14, letting the rack go up two additional teeth and make two double notes on the bell. At three-quarters after the hour has been repeated the tooth of arm 15 moves onto the lowest step of the snail, and three double notes are in similar manner struck. The lever $d$ moves up and down from the same step of front snail $b$ until the next hour is reached, when it falls down onto another step. The impulse and detent-rack pawls are released about four or five minutes before each quarter by means of one of the four pins $j$ raising rocking lever $l$. To cause the clock to strike merely the hours and quarters without repeating the hours at the quarters, the setting-lever 43 is moved to its middle position, which will allow the arm 35 to move upward and to the right, so as to bring extension 39 into line with pin 40 of the rack, so that the rack will be prevented from swinging far enough down to strike the hours at the quarters, but will be free to swing the necessary three teeth for the quarters. When, however, the time for the hour is nearly reached, pin 47 on star-wheel 10 strikes the hook or projection 41 on the check-lever 34 and rocks the check-lever away from the rack, permitting the rack to fall the number of teeth necessary to sound the hour. The check-lever 34 thus constitutes a stop for preventing the striking of the hours at the quarters and the pin 47 a trip for said stop for striking the number of hours when the hours themselves are indicated.

To prevent the clock from striking at all, the setting-lever is moved to the extreme left, so as to bring arm 45 against the pin 9 of arm 7, holding the arm 5, with its arm 4, in the path of the arm 2 on the arbor of the striking escapement-wheel, and thus preventing the downward rocking movement of said arm to release the escapement controlling the striking mechanism. The teeth of the arms $d$ and 15 are mounted on laterally-yielding springs to permit their yielding to the snails when the striking mechanism is not used.

Having thus described my invention, what I claim is—

1. In a repeating clock, in combination with the time-train, means for repeating the hours at certain fractions thereof, a stop for preventing the operation of said repeating means, and a trip for said stop, carried by the time-train, whereby the hours are struck when indicated, but not repeated at the fractions thereof, substantially as described.

2. In a repeating clock, a pivoted rack, said rack having teeth corresponding to the hours and other teeth to certain fractions thereof, means for releasing and for driving said rack, a striking mechanism, a pivoted check-lever adapted to engage with said rack, a rocking releasing-arm for said striking mechanism, a setting-lever, having means to adjust said check-lever or release-arm in locking position, and a trip adapted to release said check-lever, substantially as described.

3. In a repeating clock, in combination with striking mechanism, a locking and release device for said striking mechanism, a rocking arm, connections between said arm and the striking mechanism whereby the former is operated by the latter, a snail having steps of varying lengths, said snail mounted on the locking and release device, said rocking arm adapted to contact with said snail, substantially as described.

4. In a repeating clock, in combination with the time-train, a swinging rack, means to control the movement of the rack by the time-train, a striking mechanism, a pivoted lever adapted to engage and release said mechanism, a snail mounted on said lever, a rocking contact-arm secured to said rack and extending below said snail and adapted to engage the same, substantially as described.

5. In a repeating clock, in combination with the time-train, a star-wheel mounted on the main arbor thereof, said wheel having its points corresponding in number to certain fractions of an hour, a snail, said snail provided with pins adapted to be engaged by the star-wheel, a rocking arm on which said snail is mounted, a striking mechanism, a locking-pin on said rocking arm, means of engagement between the pin and the striking mechanism, means to release said pin, and a second rocking arm adapted to contact with the snail to restore said pin to locking position, substantially as described.

6. In a repeating clock, in combination with a mainspring and a time-train, a striking mechanism, a spring for driving said striking mechanism, a connection between the time-train and spring whereby the latter is wound, a star-wheel having points corresponding to certain intervals of an hour, a rocking arm, a latch at one end of said arm, an escapement for said spring, connections between said latch and escapement, a trip at the other end of said arm, said star-wheel bearing against said trip end of the arm, whereby each point of the star-wheel will trip the arm and latch and release the spring, substantially as described.

7. In a clock, a plurality of pivoted bell-hammers, means to simultaneously vibrate said hammers, a swinging stop mechanism operated by the vibration of the hammers, a projection on said stop mechanism, an arm on one of said hammers, adapted to contact with said projection, substantially as and for the purpose described.

8. In a clock, a swinging rack, a detent-pawl for said rack, means on the time-train to release said pawl, an hour-snail, a rocking bar carried by said rack and adapted to contact with the snail to control the extent of movement of the rack, a vibrating bell-hammer, a rotating wheel carrying pins to actuate said hammer, an escapement controlling said wheel, a rocking arm, a pin carried by said arm and adapted to engage said escapement, a star-wheel carried by the time-train and means on said rocking arm with which said star-wheel engages to control the release of the escapement and an impulse-pawl carried by said hammer and adapted to engage the rack, whereby the latter is retained by the vibration of the hammer, substantially as described.

9. In a repeating clock in combination with the hours and quarters striking mechanism, mechanism to repeat the hours at the quarters, the swinging rack, a projection on said rack, a pivoted check-lever, an escapement controlling the striking mechanism, a rocking release-arm engaging said escapement, a setting-lever movable into three positions, to hold the check-lever out of engagement with the rack, to carry the check-lever into engagement with the rack to thereby prevent the operation of the hour-repeating mechanism, and to lock the rocking release-arm into engagement with the escapement to prevent striking, substantially as described.

10. In a clock, mechanisms for striking hours and fractions of an hour, means to repeat the hours at the quarters, the swinging rack, the bell-hammers, a rotating wheel, pins on said wheel to vibrate said hammers, an arm on one of said hammers, a projection on said swinging rack, said projection adapted to strike said arm and separate the hammers at the end of the repetition of the hours, whereby in the continued vibration of the hammers the striking of the fractions of the hours will give a double sound, substantially as described.

In testimony whereof I have signed my name to this specification in the presence of two subscribing witnesses.

ENRIQUE TORRES.

Witnesses:
H. P. DOOLITTLE,
JOS. H. BLACKWOOD.